US006872318B2

(12) United States Patent
Kerfoot

(10) Patent No.: US 6,872,318 B2
(45) Date of Patent: *Mar. 29, 2005

(54) MICROPOROUS DIFFUSION APPARATUS

(76) Inventor: William B. Kerfoot, 49 Ransom Rd., Falmouth, MA (US) 02540

( * ) Notice: Subject to any disclaimer, the term of this patent is extended or adjusted under 35 U.S.C. 154(b) by 90 days.

This patent is subject to a terminal disclaimer.

(21) Appl. No.: 09/943,111

(22) Filed: Aug. 30, 2001

(65) Prior Publication Data

US 2002/0134733 A1 Sep. 26, 2002

Related U.S. Application Data

(63) Continuation of application No. 09/606,952, filed on Jun. 29, 2000, now Pat. No. 6,284,143, which is a continuation of application No. 09/220,401, filed on Dec. 24, 1998, now Pat. No. 6,083,407, which is a continuation of application No. 08/756,273, filed on Nov. 25, 1996, now Pat. No. 5,855,775, which is a continuation-in-part of application No. 08/638,017, filed on Apr. 25, 1996, now abandoned, which is a continuation-in-part of application No. 29/038,499, filed on May 5, 1995, now abandoned.

(51) Int. Cl.$^7$ .................................................. C02F 1/72
(52) U.S. Cl. ...................... 210/747; 210/752; 210/758; 210/760; 210/908; 405/128.3; 405/128.45
(58) Field of Search ................................ 210/747, 752, 210/758, 760, 908; 405/128.3, 128.45

(56) References Cited

U.S. PATENT DOCUMENTS

| 4,639,314 A | 1/1987 | Tyer |
| 4,696,739 A | 9/1987 | Pedneault |
| 4,966,717 A | 10/1990 | Kern |

(Continued)

FOREIGN PATENT DOCUMENTS

| JP | 4-171036 | 6/1992 |
| JP | 6-023378 | 1/1994 |

OTHER PUBLICATIONS

"Mass Transfer in a Gas Sparged Ozone Reactor", A.G. Hill et al., First International Symposium on Ozone for Water & Wastewater Treatment, Dec. 2–5, 1973, pp. 367–380.
"Ozone Contacting Systems", Dr. D.E. Stahl, First International Symposium on Ozone for Water & Wastewater Treatment, Dec. 2–5, 1973, pp. 40–55.
"Handbook of Ozone Technology and Applications", Rip G. Rice et al., vol. 1, 1982, Ann Arbor Science, 2 pages.
"Ozonization Manual for Water and Wastewater Treatment", Dr. W.J. Masschelein, Wiley–Interscience Publication, 1982, pps. 1, 48–53.

(Continued)

Primary Examiner—Betsey Morrison Hoey
(74) Attorney, Agent, or Firm—Fish & Richardson P.C.

(57) ABSTRACT

Apparatus for active in situ multi-element gas sparging for bioremediation or physico-chemical degration for removal of contaminants in a soil formation containing a subsurface groundwater aquifer or a substantially wet unsaturated zone, the multi-gas contained in bubbles, wherein the apparatus includes a plurality of injection wells extending to a depth of a selected aquifer; introducing an oxidizing agent comprising ozone mixed with ambient air to provide a multi-element gas by means of microporous diffusers, without applying a vacuum for extraction of stripped products or biodegration by-products, wherein said diffusers form micro-fine bubbles containing said multi-element gas that oxidizes, by stripping and decomposition, chlorinated hydrocarbons from the aquifer and surrounding saturated soil formation into harmless by-products; also including a pump for agitating water in the well selecting microbubbles, injecting them into the aquifer and effective to alter the path of micro-fine bubbles through a porous solid formation whereby enhanced contact between the oxidizing agent contained in each said bubble by stripping pollutant from solution in ambient water into the mini-atmosphere of each bubble effective to increase the efficiency and speed of remediation of a site.

49 Claims, 12 Drawing Sheets

U.S. PATENT DOCUMENTS

| | | | |
|---|---|---|---|
| 5,116,163 A | | 5/1992 | Bernhardt |
| 5,122,165 A | | 6/1992 | Wang et al. |
| 5,180,503 A | | 1/1993 | Gorelick et al. |
| 5,205,927 A | * | 4/1993 | Wickramanayake |
| 5,221,159 A | | 6/1993 | Billings et al. |
| 5,227,184 A | | 7/1993 | Hurst |
| 5,246,309 A | | 9/1993 | Hobby |
| 5,277,518 A | | 1/1994 | Billings et al. |
| 5,389,267 A | | 2/1995 | Gorelick et al. |
| 5,425,598 A | | 6/1995 | Pennington |
| 5,451,320 A | | 9/1995 | Wang et al. |
| 5,472,294 A | * | 12/1995 | Billings et al. |
| 5,698,092 A | | 12/1997 | Chen |
| 5,851,407 A | | 12/1998 | Bowman et al. |
| 5,879,108 A | | 3/1999 | Haddad |
| 6,007,274 A | | 12/1999 | Suthersan |
| 6,217,767 B1 | | 4/2001 | Clark |
| 6,283,674 B1 | | 9/2001 | Suthersan |
| 6,391,259 B1 | | 5/2002 | Malkin et al. |
| 6,403,034 B1 | | 6/2002 | Nelson et al. |

OTHER PUBLICATIONS

"Ozonization Manual for Water and Wastewater Treatment", Dr. W.J. Masschelein, Wiley–Interscience Publication, 1982, pps. 136–139.

"Ozonization Manual for Water and Wastewater Treatment", Dr. W.J. Masschelein, Wiley–Interscience Publication, 1982, pps. 300–305.

"Ozonization Manual for Water and Wastewater Treatment", Dr. W.J. Masschelein, Wiley–Interscience Publication, 1982, pps. 306–309.

"Ozone in Water Treatment, Application and Engineering", B. Langlais et al., American Water Works Association Research Foundation, 1991, p. 389.

"Analytical Aspects of Ozone Treatment of Water and Wastewater", Rip G. Rice et al., Lewis Publishers, Inc., 1986, p. 13.

"Ozone in Water and Wastewater Treatment", F.L. Evans III et al., Ann Arbor Science Publishers Inc., 1982, *Chapter VIII, Practical Aspects of Water and Waste Water Treatment by Ozone*, E.W.J. Diaper, pp. 145–179.

"Ozone Design Considerations for Water Treatment", R.C. Renner et al., Presented at AWWA Rocky Mountain Section Meeting in Keystone, CO., Sep. 16–19, 1984, pp. 103–121.

"Ozone Treatment at Monroe, Michigan", W. L. LePage, Second International Symposium on Ozone Technology, May 11–14, 1975, pp. 198–210.

"Ozone Mass Transfer and Contact Systems", W. S. Sease, Second International Symposim on Ozone Technology, May 11–14, 1975, pp. 1–14.

"Design of an Ozonation System for a Wastewater Treatment Facility—A Case History", Jain S. Jain et al., First International Symposium on Ozone for Water & Wastewater Treatment, Dec. 2–5, 1973, pp. 852–877.

"Factors Controlling the Removal of Organic Pollutants in an Ozone Reactor", M.D. Gurol, AWWA 1984 Annual Conference, Dallas, TX, Jun. 10–14, 1984, pp. 2–21.

"In–situ Air Sparging Without Inorganic Nutrient Amendment: An Effective Bioremediation Strategy for Treating Petroleum–Contaminated Groundwater Systems", R. Schaffner, Jr., et al., http://www.bioremediationgroup.org/BioReferences/Tier1Papers/insitu.htm, Jul. 30, 2003, pp. 1–14.

"Environmental Management", DON Environmental Restoration Plan for Fiscal Years 1997–2001, Sep. 30, 1996, pp. 4–1 to 4–8.

"How to Evaluate Alternative Cleanup Technologies for Underground Storage Tank Sites", *U.S. Environmental Protection Agency*, Oct. 1994.

"Yuma Pilot–Testing Ozone Sparging, Stripping", *Pasha Publications, Defense Cleanup*, Nov. 8, 1996, pp. 5–6.

"Chemical Degradation of Aldicarb in Water Using Ozone", F.J. Beltran et al., *Journal of Chemical Technology & Biotechnology*, 1995, pp. 272–278.

"Modelling Industrial Wastewater Ozonation in Bubble Contactors", *Ozone Science & Engineering*, vol. 17, 1995, pp. 379–398.

"Modelling Industrial Wastewater Ozonation in Bubble Contactors", *Ozone Science & Engineering*, vol. 17, 1995, pp. 355–378.

"Kinetics of the Bentazone Herbicide Ozonation", *Journal of Environmental Science and Health*, vol. A31, No. 3, 1996, pp. 519–537.

"Field Applications of In Situ Remediation Technologies: Chemical Oxidation", *U.S. Environmental Protection Agency*, Sep. 1998, pp. 1–31.

"Technology Status Review In Situ Oxidation", *Environmental Security Technology Certification Program*, Nov. 1999, pp. 1–42.

Design of a Packed Bed Ozonation Reactor for Removal of Contaminants from Water, Billing, *Dissertation Abstracts International*, vol. 57, No. 10, Apr. 1997, pp. 6398–B.

"Completed North American Innovative Remediation Technology Demonstration Projects", *U.S. Environmental Protection Agency, Office of Solid Waste and Emergency Response*, Aug. 12, 1996, pp. 1–35.

"Ground Water Issue", H.H. Russell et al., *U.S. Environmental Protection Agency*, Jan. 1992, pp. 1–10.

"In Situ Chemical Treatment", Y. Yin, Ph.D., *Technology Evaluation Report, GWRTAC*, Jul. 1999, pp. 1–74.

"Analysis of Selected Enhancements for Soil Vapor Extraction", U.S. Environmental Protection Agency, Sep. 1997, pp. 1–5 to 7–39.

Biologisch–chemische Behandlung Eines Kontaminierten Grundwassers von einem Gaswerksgelande, Dr.–Ing. Joachim Behrendt, *Technische Universitat Hamburg*–Harburg, Germany, vol. 136, No. 1, Jan. 1995, pp. 18–24.

"Single–phase Membrane Ozonation of Hazardous Organic Compounds in Aqueous Streams", P.V. Shanbhag et al., *Journal of Hazardous Materials* 41, 1995, pp. 95–104.

Gas Partitioning of Dissolved Volatile Organic Compounds in the Vadose Zone: Principles, Temperature Effects and Literature Review, J.W. Washington, GROUNDWATER, vol. 34, No. 4, Jul.–Aug. 1996, pp. 709–718.

"Biologically Resistant Contaminants, Primary Treatment with Ozone", D.F. Echegaray et al., *Water Science and Technology, A Journal of the International Association on Water Quality*, vol. 29, No. 8, 1994, pp. 257–261.

"Toxins , toxins everywhere", K.K. Wiegner, *Forbes*, Jul. 22, 1991, pp. 298.

"In Situ Air Sparging Systems", *Tech Data Sheet, Naval Facilities Engineering Service Center*, Mar. 1997, pp. 1–4.

"Ground Water, Surface Water, and Leachate", http://www-.frtr.gov/matrix2/section 4/4–30,html, Jul. 22, 2003, pp. 1–4.

"Alternate Technologies for Wastewater Treatment", J. Hauck et al., *Pollution Engineering*, May 1990, pp. 81–84.

"Cleaning up", *Forbes*, Jun. 1, 1987, pp. 52–53.

"In Situ Chemical Oxidation for Remediation of Contaminated Soil and Ground Water", EPA Sep. 2000, Issue No. 37, pp. 1–6.

"Aquifer Remediation Wells", EPA, vol. 16, Sep. 1999, pp. 1–80.

"Transfer Rate of Ozone across the Gas–Water Interface", Okouchi et al., The Chemical Society of Japan, No. 2, 1989, pp. 282–287.

"Effect of Organic Substances on Mass Transfer in Bubble Aeration", M. Gurol et al., *Journal WPCF*, vol. 57, No. 3, pp. 235–240.

"Clare Water Supply", EPA, http://www.epa.gov/region5/superfund/npl/michigan/MID980002273.htm, pp. 1–3.

"Who's Afraid of MTBE?", K.P. Wheeler et al., *Manko, Gold & Katcher*, http://www.rcc-net.com/Wheels.htm, Jul. 2000, pp. 1–5.

"RCC RemedOzone Mobile Remediation System", RCC.

"Santa Barbara I Manufactured Gas Plant Site", *California EPA*, Jan. 2002, pp. 1–6.

"Typical Applications of Ozone", ARCE Systems, Inc., http://www.arcesystems.com/products/ozone/applications.htm, Feb. 2000, pp. 1–2.

"Strategies to Protect Your Water Supply from MTBE", Komex Industries, http://www.komex.com/industries/remediation.stm, 2002, pp. 1–8.

"In Situ Remediation with Chemical Oxidizers: Ozone, Peroxide and Permanganate", Environmental Bio-systems, Inc., pp. 1–5.

"Newark Brownfield Site to Increase Student Housing", Environmental Alliance Monitor, http://www.envalliance.com/monitor&pubs/1998fall.htm, 1998, pp. 1–8.

"In Situ Ozonation to Remediate Recalcitrant Organic Contamination", J. Dablow et al., IT Corporation, pp. 1–2.

* cited by examiner

71: AC TO DC POWER CONVERTER (OR TRICKLE CHARGED LEAD ACID BATTERY)

72: OZONE GENERATOR

73: WELL GAS RELAYS (3 WELLS SHOWN)

74: COMPRESSOR

75: MASTER RELAY

76: MAIN FUSE

77: PROGRAMMABLE TIME-CONTROLLER

78: POWER STRIP

79: GAS REGULATOR AND PRESSURE GAGE

80: SOLENOID MANIFOLD (NUMBER DEPENDS ON SERIES AND NUMBER WELL)

81: GROUND FAULT INTERRUPTOR

82: COOLING FAN

MICROPOROUS DIFFUSION APPARATUS

CROSS-REFERENCE TO RELATED APPLICATIONS

This application is a continuation application of application Ser. No. 09/606,952 filed Jun. 29, 2000 (allowed U.S. Pat. No. 6,284,143) which was a continuation of U.S. application Ser. No. 09/220,401, filed Dec. 24, 1998 (allowed U.S. Pat. No. 6,083,407), which is a continuation of U.S. application Ser. No. 08/756,273, filed Nov. 25, 1996 (allowed U.S. Pat. No. 5,855,775) which was a continuation-in-part of application Ser. No. 08/638,017 filed on Apr. 25, 1996 (abandoned) which was a continuation-in-part of application Ser. No. 29/038,499 filed on May 5, 1995 (abandoned). The disclosure of the prior applications are considered part of and are incorporated by reference in the disclosure of this application.

BACKGROUND OF THE INVENTION

1. Field of the Invention (Technical Field)

The present invention relates to apparatuses for remediation of dissolved chlorinated hydrocarbons in aquifer regions by injecting micro-fine bubbles effective for active in situ groundwater remediation for removal of dissolved chlorinated hydrocarbon solvents and dissolved hydrocarbon petroleum products. Remediation of saturation soils may also be obtained by employment of the present invention.

2. Background Prior Art

There is a well recognized need to cleanup of subsurface leachate plumes in aquifer regions and contaminated sites including in particular, dry-cleaning establishments and U.S. Military Air bases. Applicant is aware of prior art devices that have used injection of air to facilitate biodegradation of plumes.

However there has not been shown apparatus for remediating a site in a controlled manner of poorly biodegradable organics, particularly dissolved chlorinated solvents with micro-fine bubbles including a multi-gas oxidizing agent.

In fact the Federal Agency (EPA, KERR Environmental Laboratory, ADA, Oklahoma) responsible for review of clean-up procedures at Marine Corp Air Base at Yuma, Ariz. has determined that there is no prior references which disclose the use of the present invention and has ordered independent pilot tests to provide test results confirming the results previously obtained by the present invention.

In U.S. Pat. No. 5,221,159, to Billings shows injection of air into aquifer regions to encourage biodegradation of leachate plumes which contain biodegradable organics together with simultaneous soil vacuum extraction.

In U.S. Pat. No. 5,269,943, METHOD FOR TREATMENT OF SOILS CONTAMINATED WITH ORGANIC POLLUTANTS, to Wickramanayake shows a method for treating soil contaminated by organic compounds wherein an ozone containing gas is treated with acid to increase the stability of the ozone in the soil environment and the treated ozone applied to the contaminated soil to decompose the organic compounds.

In U.S. Pat. No. 5,525,008, REMEDIATION APPARATUS AND METHOD FOR ORGANIC CONTAMINATION IN SOIL AND GROUNDWATER, to Wilson provides a method and apparatus for in-situ treatment of soil and groundwater contaminated with organic pollutants. It involves concentration of a reactive solution required to effect treatment of the contaminated area; injecting the reactive solution into one or more injectors that are inserted into the ground, scaled and positioned so as to assure flow and allowing reactive solution to flow through the contaminated area thereby reacting chemically. Preferably, the reactive solution is an aqueous solution of hydrogen peroxide and metallic salts.

In U.S. Pat. No. 5,178,755, UV-ENHANCED OZONE WASTEWATER TREATMENT SYSTEM, to LaCrosse ozonated liquid is mixed within a multi-stage clarifier system with wastewater to be treated and suspended solids are removed.

However, notwithstanding the teachings of the prior art, there has not been shown apparatus for remediating a site in a controlled manner of poorly biodegradable organics, particularly dissolved chlorinated solvents with micro-fine bubbles including an encapsulated multi-gas oxidizing agent. The present invention accomplishes this by employing microporous diffusers injecting multi-gas bubbles containing an ozone oxidizing agent into aquifer regions to insitu strip and rapidly decompose poorly biodegradable organics or to accelerate biodegradation of leachate plumes which contain biodegradable organics which overcomes at least some of the disadvantages of prior art.

SUMMARY OF THE INVENTION

The present invention relates to sparging apparatus for injection of oxidizing gas in the form of small bubbles into aquifer regions to encourage in situ remediation of subsurface leachate plumes.

In particular the present invention is directed to sparging apparatuses for employing microporous diffusers for injecting micro-fine bubbles containing encapsulated gas bubbles into aquifer regions to encourage biodegradation of leachate plumes which contain biodegradable organics, or Criegee decomposition of leachate plumes containing dissolved chlorinated hydrocarbons. The sparging apparatuses of the present invention, employing microporous diffusers for injecting an encapsulated multi-gas oxidizing agent, are particularly useful in that the apparatuses promote extremely efficient removal of poorly biodegradable organics, particularly dissolved chlorinated solvents, without vacuum extraction of undesirable by-products of remediation and wherein remediation occurs by employing encapsulated multi-gas oxidizing agent for destroying organic and hydrocarbon material in place with without release of contaminating vapors.

Unlike the prior art, the contaminated groundwater is injected with an air/ozone mixture wherein micro-fine air bubbles strip the solvents from the groundwater and the encapsulated ozone acts as an oxidizing agent in a gas/gas reaction to break down the contaminates into carbon dioxide, very dilute HCL and water. This system is known as the C-Sparge system.

The present invention, hereinafter C-Sparger system™ is directed to low-cost removal of dissolved chlorinated hydrocarbon solvents such as perc from contaminated soil and groundwater aquifers. The C-Sparger™ system employs microporous diffusers, hereinafter Sparge Points® for producing micro-fine bubbles containing an oxidizing agent that decomposes chlorinated hydrocarbons into harmless byproducts. The C-Sparger™ also incorporates pumps means for pumping the an multi-gas oxidizing mixture through the Spargepoint diffuse into groundwater in a soil formation; a subble production chamber to generate bubbles of differing size, a timer to delay pumping until large bubbles have segregated from small bubbles by rise time, and a pump which forces the fine bubbles and liquid out into the formation. The pump means intermittently agitates the water in the well in which the C-Sparger is installed which is effective to disturb the normal inverted cone-shaped path of the bubbles injected by the Sparge point through the soil formation and disperses them in a random manner, ensuring improved contact between the oxidizing agent (contained in each bubble) by stripping the pollutant from solution in the water into the mini-atmosphere contained in each bubble. The pulsing action promotes movement of the bubbles through the porous formation. It is the insitu stripping action and maintenance of low solvent gas concentration in the bubbles which increases the efficacy and speed (and resulting cost) of remediation of a site.

The apparatus of the present invention for removal contaminants from soil and an associated subsurface groundwater aquifer using microporous diffusers in combination with a multi-gas system are particularly useful in that the system promotes extremely efficient removal of poorly biodegradable organics, particularly dissolved chlorinated solvents, without vacuum extraction, and wherein remediation occurs by destroying organic and hydrocarbon material in place with without release of contaminating vapors.

In the present invention the microporous diff-users and multi-gas system comprises oxidizing gas encapsulated in micro-bubbles generated from microporous diffusers matched to soil porosity. A unique bubble size range is matched to underground formation porosity and achieves dual properties of fluid like transmission and rapid extraction of selected volatile gases, said size being so selected so as to not to be so small as to lose vertical mobility. In order to accomplish a proper matching, a prior site evaluation test procedure is devised to test effectiveness of fluid transmission at the site to be remediated.

The advantage of controlled selection of small bubble size promotes rapid extraction of selected volatile organic compounds, such as PCE, TCE, or DCE with an exceptionally high surface to gas volume ratio. The dual capacity of the small bubble production pulsed injection and rise time is matched to the short lifetime of an oxidative gas, such as ozone to allow rapid dispersion into predominantly water-saturated geological formations, and extraction and rapid decomposition of the volatile organic material. The unique apparatus of the present invention provides for extraction efficiency with resulting economy of operation by maximizing contact with oxidant by selective rapid extraction providing for optimum fluidity to permit bubbles to move like a fluid through media which can be monitored.

The use of microporous diffuser points provides a more even distribution of air into a saturated formation than the use of pressurized wells. A sparge system installed to remediate contaminated groundwater is made more cost-effective by sparging different parts of the plume area at sequenced times. Through the proper placement of sparge locations and sequence control, any possible off-site migration of floating product is eliminated. With closely spaced sparge points, water mounding is used to advantage in preventing any off-site escape of contaminant. The mounding is used to herd floating product toward extraction sites.

In the present invention, the microporous diffusers and multi-gas system, hereinafter referred to as C-Sparger™ Systems are designed to remove dissolved organics and solvents (chlorinated hydrocarbons) such as PCE, TCE, and DCE from contaminated groundwater. The micro-fine bubbles produced by the Spargepoint diffusers contain oxygen and ozone which oxidize the chlorinated hydrocarbons to harmless gases and weak acids. High initial concentrations of these dissolved organics have been, under (some specific-circumstances, reduced to levels of 1 ppb or less in periods of a few weeks. None of the models to date are designed for explosive environments.

The present invention employs a plurality of configurations consisting of Series 3500 and Series 3600 C-Sparge models. The 3600 Series is larger and has more capacity. Specifically, the 3600 Series has a better compressor rated for continuous use, a larger ozone generator, a second spargepoint below the first in each well, and larger diameter gas tubing. Both model series have control units that can support: one (Models 3501 & 3601), two (Models 3502 & 3602) and three separate wells (Models 3503 & 3603). The *differences between the one, two, and three well models are in the number of relays, internal piping, external ports and programming of the timer/controller.

Normal operation for C-Sparger™ systems includes carrying out, in series for each well, the following functions on a time basis: pumping air & ozone through Spargepoint diffusers into the soil formation, pumping aerated/ozonated water in the well into the soils and recovering treated water above. Treatment is followed by a programmable period of no external treatment and multiple wells are sequenced in turn. Agitation with pumped water disturbs the usually inverted cone-shaped path of bubbles through the soils and disperses them much more widely. This increases contact and greatly improves efficiency and speed of remediation. Vapor capture is not normally necessary.

Series 3500 and 3600 systems include a control Module (Box), one to three well assemblies depending on specific model selected, a 100 ft submersible pump power-gas line for each well, a flow meter (to check spargepoint flow rates). Model Series 3500 & 3600 Control Modules have been successfully deployed outdoors in benign and moderate environments for prolonged periods of time. The Control Module must be firmly mounted vertically on 4×4 posts or a building wall near the wells.

The actual placement depths, separations, number/size of wells and overall remediation system geometry are highly variable. Differences in specific pollutant, spill, soil, groundwater and climate characteristics can greatly influence the design and geometry of the overall remediation system. Monitoring wells are usually also needed. In short, specific circumstances and conditions are often critical, however, a generic or typical overall system is shown on FIG. 1.

FIG. 1 provides the basic specification for the Series 3500 & 3600 systems. The drawing shows a single well system Series 3600 (M-3601). The Series 3500 does not have the lower Spargepoint Multiple well models (3502, 3503, 3602 & 3603) just replicate the well units using a single Control Module. FIG. 2 shows a piping schematic and FIG. 3 an electrical schematic for a 3 well system (Model 3503 or 3603). Current production 3500 and 3600 Series models have an internal Ground Fault Interrupter and surge buffers incorporated into various electrical components. FIG. 4 shows an internal layout of the Control Module box for a three well system (M-3503 or M-3603). FIG. 5 shows the geometry of the bottom panel on the Control Module identifying the external connections and ports for three well units (M-3503 & 3603). Table 2 lists fuses and their locations.

The unique use of Microfine Bubbles for simultaneous extraction/decomposition.

The use of microporous Spargepoint diffusers to create fine bubbles, which easily penetrate sandy formations to allow fluid flow, has unexpected benefits when used with multiple gas systems. Microfine bubbles accelerate the transfer rate of PCE from aqueous to gaseous state. The bubble rise transfers the PCE to the vadose zone. The ten-fold difference in surface-to-volume ratio of Spargepoint diffuser microbubbles compared to bubbles from well screens results in a four-fold improvement in transfer rates. To block the gaseous state from reverting to surface dissolved state in the vadose (unsaturated) zone, a microprocessor system shuttles an oxidizing gas through the vadose zone to chemically degrade the transported PCE.

Gaseous Exchange

If gaseous exchange is proportional to available surface area, with partial pressures and mixtures of volatile gases being held constant, a halving of the radius of bubbles would quadruple (i.e., 4x) the exchange rate. If, in the best case, a standard well screen creates air bubbles the size of a medium sand porosity, a microporous diffuser of 20 micron size creates a bubble one tenth (1/10) the diameter and then times the volume/surface ratio.

TABLE 2

| Diameter (microns) | Surface Area $4 r^2$ | Volume $4/3\, r^3$ | Surface Area/ Volume |
|---|---|---|---|
| 200 | 124600 | 4186666 | .03 |
| 20 | 1256 | 4186 | .3 |

Theoretically, the microporous bubbles exhibit an exchange rate of ten times the rate of a comparable bubble from a standard ten slot well screen.

Partitioning Enhancement

Soil Vapor concentrations are related to two governing systems: water phase and (non-aqueous) product phase. Henry's and Raoult's Laws (DiGiulio, 1990) are commonly used to understand equilibrium-vapor concentrations governing volatization from liquids. When soils are moist, the relative volatility is dependent upon Henry's Law. Under normal conditions (free from product) where volatile organic carbons (VOC's) are relatively low, an equilibrium of soil, water, and air is assumed to exist. The compound, tetrachloroethane (PCE), has a high exchange coefficient with a high vapor pressure (atm) and low aqueous solubility (umole/l). By enhancing the exchange capacity at least ten fold, the rate of removal should be accelerated substantially.

Ozone is an effective oxidant used for the breakdown of organic compounds in water treatment. The major problem in effectiveness is a short lifetime. If ozone is mixed with sewage-containing water above-ground, the half-life is normally minutes. However, if maintained in the gaseous form, the half-life of ozone can be extended to a half hour. Using the microbubbles as extracting agents, pulling chlorinated solvents out of the dissolved state into the gaseous form as they enter the bubbles ozone. The small bubbles high surface to volume ratio accelerates a) the exchange area and b) the consumption of HVOC within the bubble maximizes the ($C_s$–C) term. In reality the rate-limiting process is the area-specific diffusion (dominated by Henry's Constant), while the decomposition reaction occurs rapidly (assuming sufficient ozone). Ozone reacts quickly and quantitatively with PCE to yield breakdown products of hydrochloric acid, carbon dioxide, and water.

To offset the short life span, the ozone could be injected with microporous diffusers, enhancing the selectiveness of action of the ozone. By encapsulating the ozone in fine bubbles, the bubbles would preferentially extract volatile compounds like PCE from the mixtures of soluble organic compounds they encountered. The ozone destruction of organics would then target volatile organics selectively pulled into the fine air bubbles. Even in a groundwater mixture of high organic content like diluted sewage, PCE removal could be rapid.

The unique combination of microbubble extraction and ozone degradation can be generalized to predict the volatile organic compounds amenable to rapid removal. The efficiency of extraction is directly proportional to Henry's Constant which serves as a diffusion coefficient for gaseous exchange (Kg).

In wastewater treatment the two-film theory of gas transfer (Metcalf and Eddy, Inc, 1991) states the rate of transfer between gas and liquid phases is generally proportional to the surface area of contact and the difference between the existing concentration and the equilibrium concentration of the gas in solution. Simply stated, if we increase the surface to volume ration of contact, we increase the rate of exchange. If we consume the gas (VOC) entering the bubble (or micropore space bounded by a liquid film), the difference is maintained at a higher entry rate than if the VOC is allowed to reach saturation equilibrium. In our case, of the HVOC, PCE, the consumptive gas/gas reaction of PCE to by products of HCl, $CO_2$, and $H_2O$ accomplishes this.

The normal equation for the two-film theory of gas transfer is stated: (Metcalf and Eddy, 1991)

Vm=rate of mass transfer
Kg=coefficient of diffusion for gas
A=area through which gas is diffusing
$C_s$=saturation concentration of gas in solution
C=concentration of gas in solution the restatement of the equation to consider the inward transfer of phase change from dissolved HVOC to gaseous HVOC in the inside of the bubble would be:
$C_s$=saturation concentration of gas phase in bubble
C=initial concentration of gas phase in bubble volume Table 3 gives the Henry's Constants (Hc) for a selected number of organic compounds and the second rate constants (Rc) for the ozone radical rate of reaction. The third column presents the product of both (RRC). As a ranking of effectiveness. In actual practice the diffusion is rate-limiting, resulting in the most effective removal with PCE (tetrachloroethylene).

TABLE 3

REMOVAL RATE COEFFICIENTS FOR THE MICROBUBBLE/OZONE PROCESS - C-SPARGE

| Organic Compound | Ozone $K_2$ Second order Rate Constant[b] ($M^{-1}\,SEC^{-1}$) | $K_1$ Henry's Constant[b] | Rate Removal Coefficient |
|---|---|---|---|
| Benzene | 2 | $5.59 \times 10^{-3}$ | .0110 |
| Toluene | 14 | $6.37 \times 10^{-3}$ | .0890 |
| Chlorobenzene | 0.75 | $3.72 \times 10^{-3}$ | .0028 |
| Trichloroethylene | 17 | $9.10 \times 10^{-3}$ | .1540 |
| Tetrachloroethylene | 0.1 | $2.59 \times 10^{-2}$ | .026 |
| Ethanol | .02 | $4.48 \times 10^{-5}$ | .0000008 |

$R_c \cdot H_c$ = RRC
[a]Frome Hoigne and Bader, 1983
[b]Frpm EPA 540/1-86/060, Superfund Public Health Evaluation Manual Elimination of the Need for Vapor Extraction The need for vapor control exists when vapors of VOC's partitioned from dissolved form into the microbubbles, reach the unsaturated zone, releasing vapors. Without reaction with a decomposing gas, such as ozone, a large mass can be transmitted in a short time, creating potential health problems near residential basement areas.

The combined extraction/decomposition process has the capacity to eliminate the need for vapor capture. If the decomposition rate with ozone exceeds the virtual time-of-travel, vapors will not be produced or their concentration will be so low as to not require capture. By controlling the size of microbubbles and matching them to suitable slow rise times, the need for vapor control is eliminated.

The rise time of bubbles of different sizes was computed for water, giving the upwards gravitational velocity. The upwards velocity provides the positive pressure to push the bubbles through the porous media, following Darcy's equation. By timing the rise rate in the field; the rise time, proportional to upwards pressure, can be calculated. The bubble size is very important. Once a bubble exceeds the pore cavity size, it is significantly retarded or trapped. Pulsing of the water phase provides a necessary boost to assure steady upwards migration and reducing coalesion.

| BUBBLE DIAMETER | UPWARD VELOCITY IN WATER | TIME (MINUTES) FOR UPWARDS MIGRATION (3 METERS) (Coarse Sand and Gravel) |
| --- | --- | --- |
| 10 mm | .25 m/s | 19 min. |
| 2 mm | .16 m/s | 30 min. |
| .2 mm | .018 m/s | 240 min. |

Elimination Rate of PCE Relative to Ozone Content

The reaction of ozone with tetrachloroethane (PCE) will produce degradation products of hydrochloric acid, carbon dioxide, and water. By adjusting the ozone concentration to match the dissolved PCE level, the PCE can be removed rapidly without excess ozone release to the air or release of PCE vapor into the unsaturated zone.

Accordingly, the object and purpose of the present invention is to provide microporous diffusers for removal of contaminants from soil and associated subsurface ground water aquifer, without requiring applying a vacuum for extraction biodegradation by-products.

Another object is to provide multi-gas systems to be used in combination with the microporous diffusers to promote an efficient removal of poorly biodegradable organics, particularly dissolved chlorinated solvents, without vacuum extraction.

A further object is to provide that remediation occurs by destroying organic and hydrocarbon material in place without release of contaminating vapors to the atmosphere.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION

The present invention is directed to sparging apparatus for injection of oxidizing gas in the form of small bubbles into aquifer regions to encourage in situ remediation of subsurface leachate plumes. In particular the present invention employs microporous diffusers injecting multi-gas bubbles into aquifer regions to encourage biodegradation of leachate plumes which contain biodegradable organics, or Criegee decomposition of leachate plumes containing dissolved chlorinated hydrocarbons.

Figure 1:
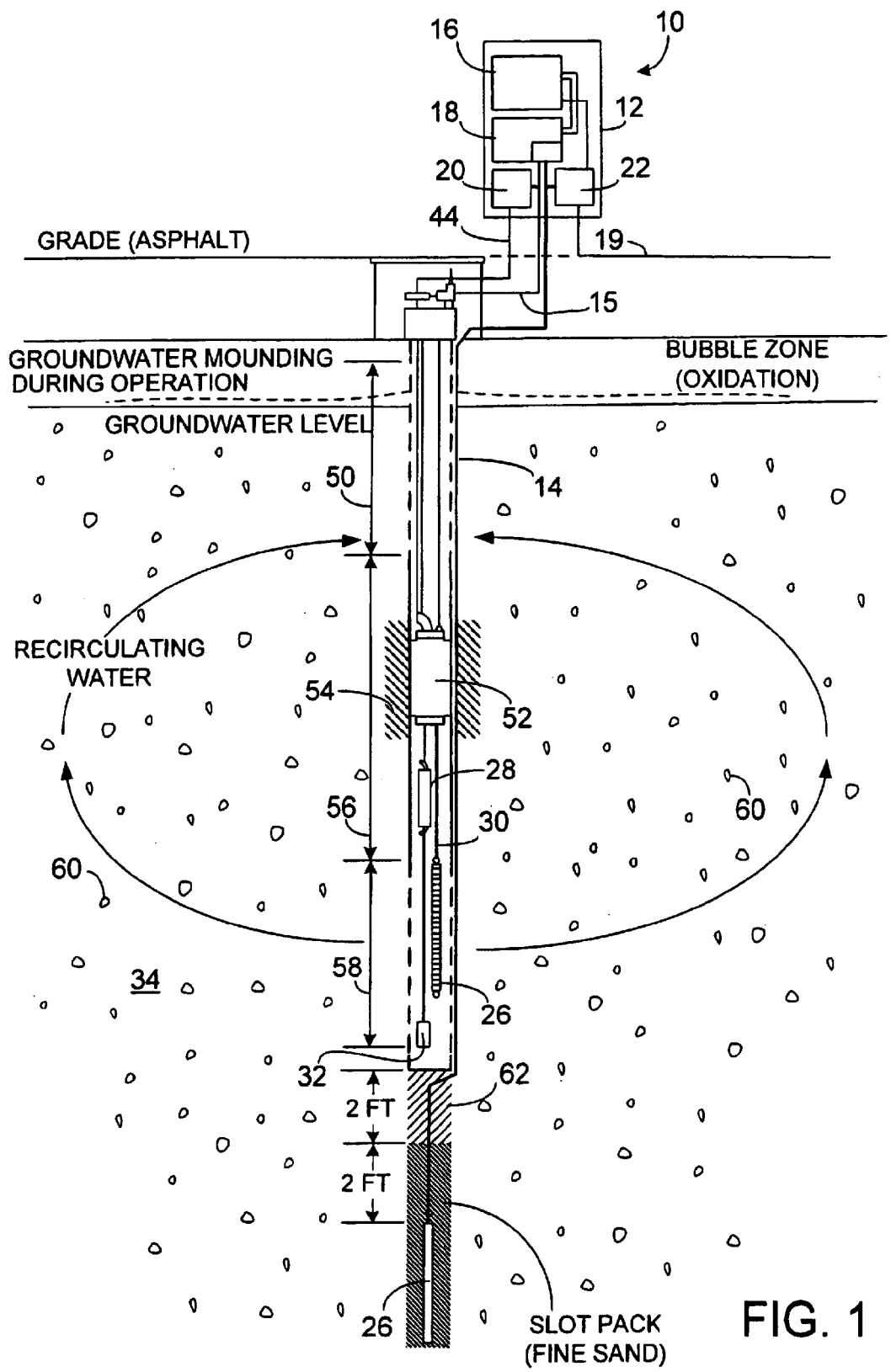
FIG. 1 is a cross sectional schematic illustration of a soil formation showing the apparatus of the present invention.
Figure 2:
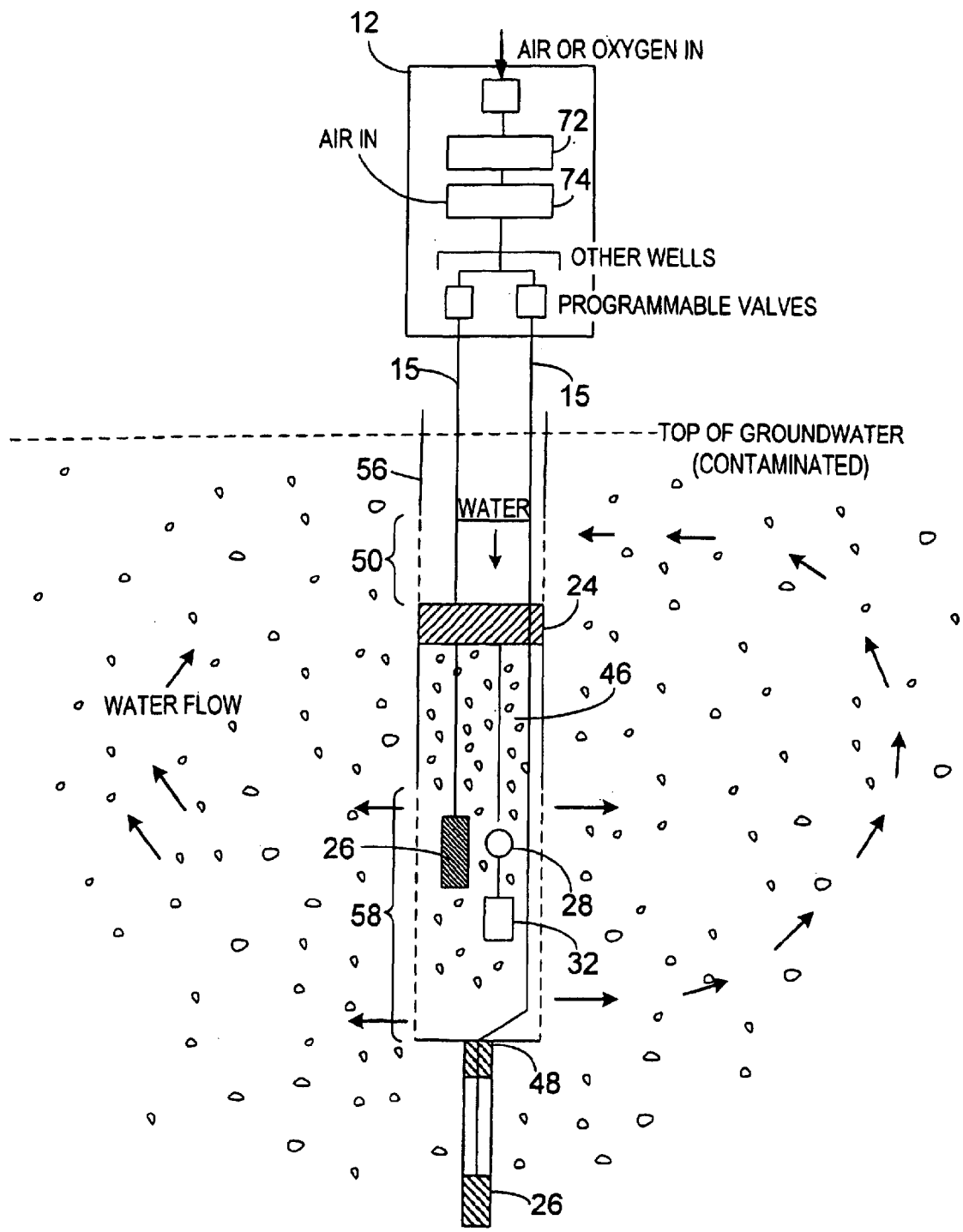
FIG. 2 is shows an enlarged piping schematic of the present invention of FIG. 1 showing the unique fine bubble production chamber.
Figure 3:
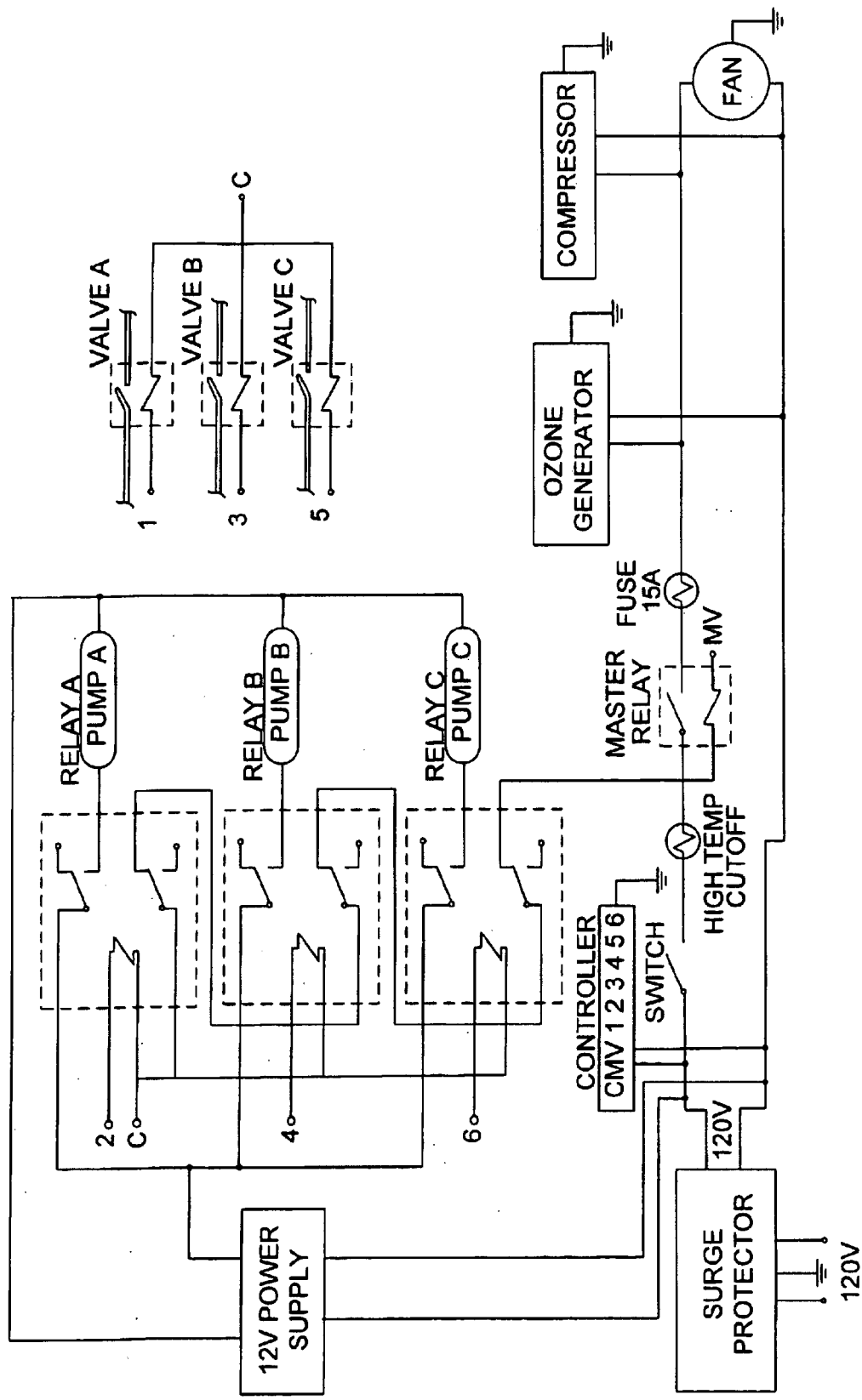
FIG. 3 is an electrical schematic for a 3 well system (Model 3503 or 3603) of the present invention of FIG. 1.

Referring to the FIGS. 1 through 6 there is shown a Sparge System 10 consisting of multiple microporous diffusers in combination with an encapsulated multi-gas system, the system 10 consists of a master unit 12 and one or more in-well sparging units 14. Each master unit 12 can operate up to a total of three wells simultaneously, and treating an area up an 50 feet wide and 100 feet long. Actual performance depends upon site conditions. Vapor capture is not normally necessary. In the preferred embodiment, as shown in FIG. 1, and FIG. 2 master unit 12 consists of the following: a gas generator 16, a gas feed line 15, a compressor 18, a power source 19, a pump control unit 20, a timer 2. The master unit 12 must be firmly mounted on 4×4 posts 40 or building wall 42 near in-well sparging units 14. A heavy-duty power cable 44, not over 50 feet in length, may be used to run from the power source to the master unit 12.

Referring to FIGS. 1 and 2, the in-well sparging unit 14 consists of a casing 56, an inlet screen 50 an expandable packer 52, an upper site grout 54, an outlet screen 58, and lower grout 62. Each inwell unit 14 includes a fixed packer 24, at least two diffusers 26 hereinafter "Spargepoint(r)™ diffusers" 26, a water pump 28, ozone line 30, check valve 32, and fittings 34. As is shown in FIGS. 1 and 2 the diffuser 26 employs a microporous diffuser in place of standard slotted well screen to improve dispersions of bubbles 60 through soil shown at 84 and improve rate of gaseous exchange. A normal 10-slot PVC well screen contains roughly twelve percent (12%) open area. Under pressure most air exits the top slits and radiates outward in a starlike fracture pattern, evidencing fracturing of the formation.

Figure 4:
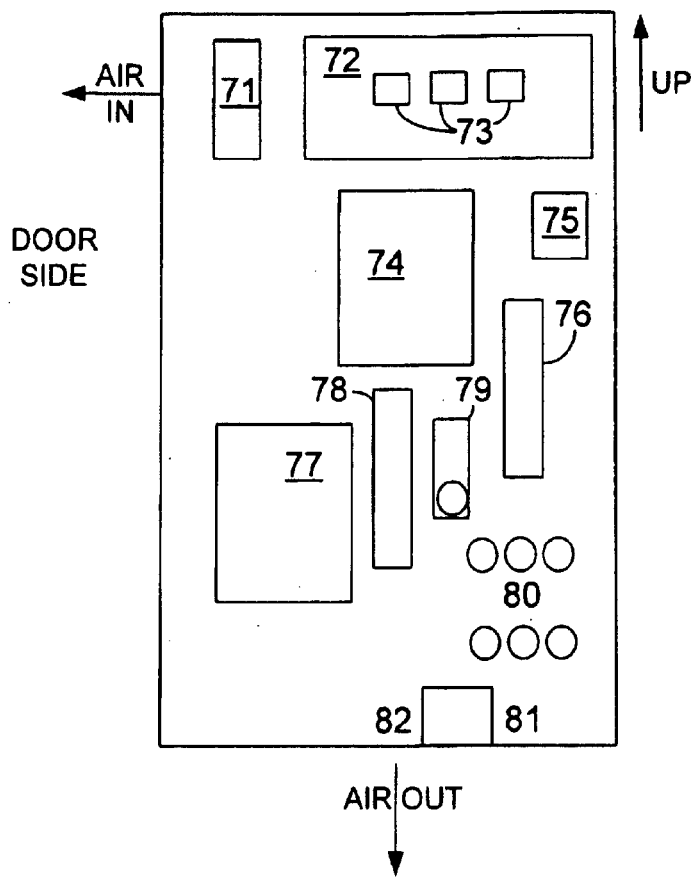
FIG. 4 shows an internal layout of the Control Module box for a three well system (M-3503 or M-3603) of the present invention of FIG. 1.
Figure 5A:
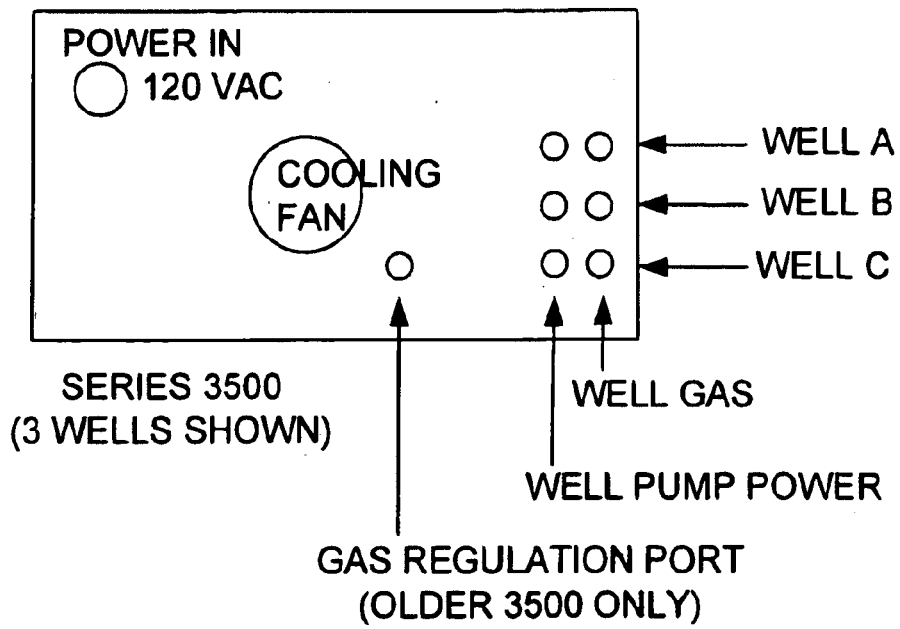
FIG. 5A shows the geometry of the bottom panel on the Control Module identifying the external connections and ports for three well units (M-3503 & 3603) of the invention of FIG. 1.
Figure 5B:
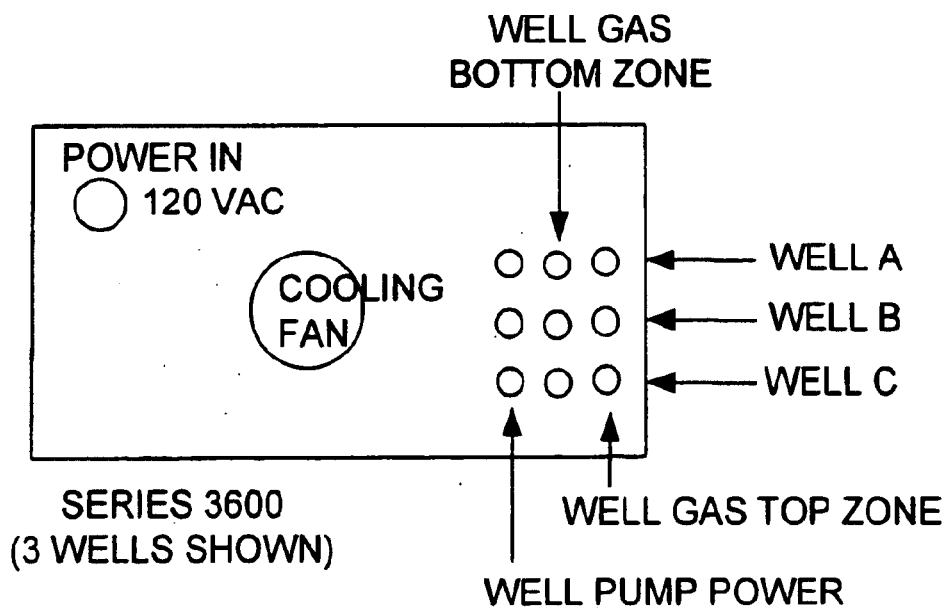
FIG. 5B is the left side view of FIG. 5A.
Figure 6:
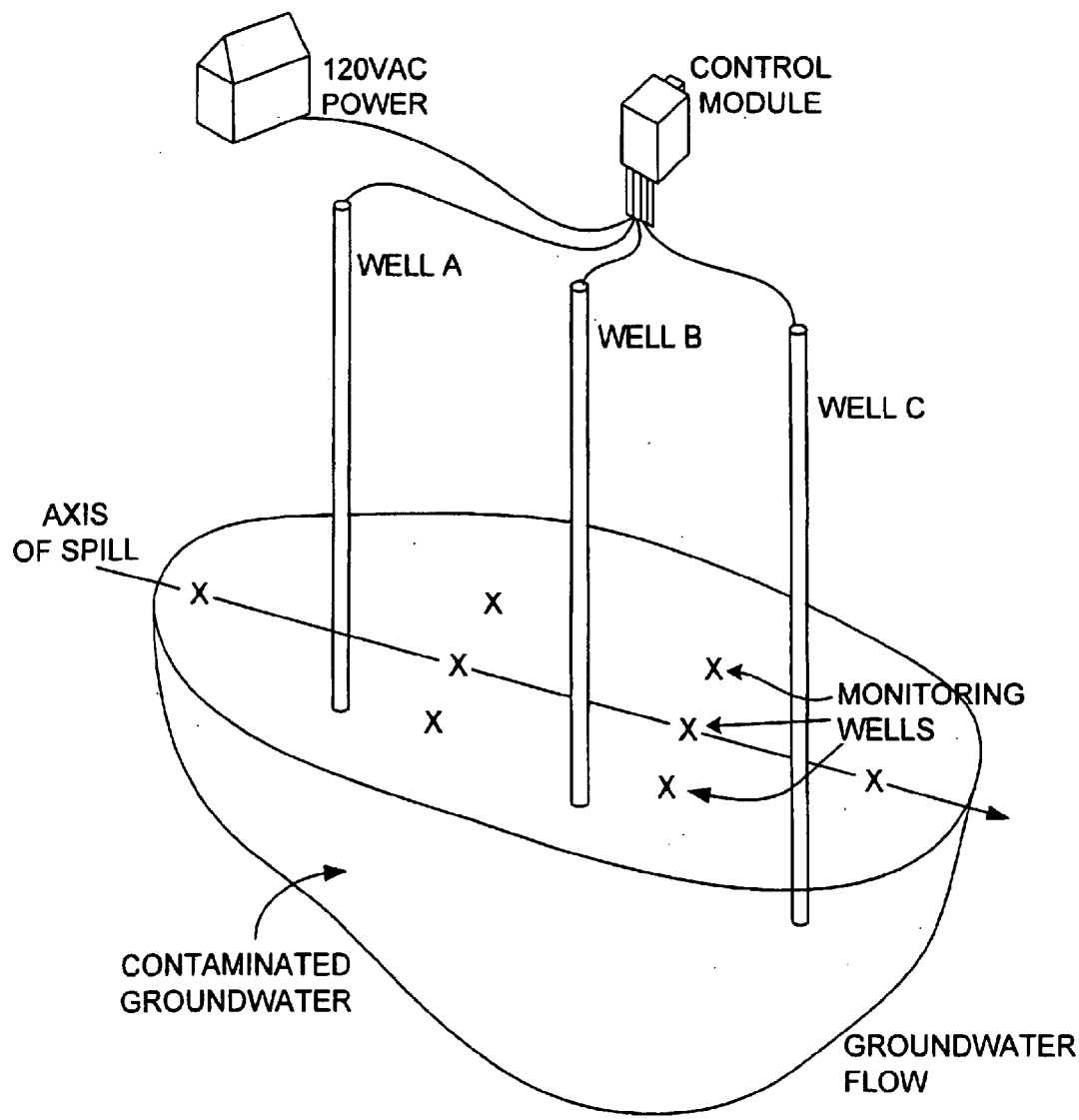
FIG. 6 is a schematic illustration of a soil formation showing the apparatus of the present invention.

Referring to FIG. 2 there is shown a fine bubble production chamber 46 positioned in the well casing 56 between the upper well screen 50 positioned immediately below fixed packer 24 consisting of a removable closure plug and the lower plug 48 consisting of the fine bubble production chamber 46 containing bubbles 60 including upper Spargepoint™ 26 positioned above lower well screen 58 including pump 28 and check valve 32. Referring to FIG. 4 there is shown the internal layout of the control module box 12 including an AC/DC power converter 71, and ozone generator 72, well gas relays 73 (three wells shown) a compressor 74, a master relay 75, a main fuse 76. There is also shown a programmable timer controller 77, a power strip 78, a gas regulator and pressure gauge 79, together with a solenoid manifold 80, a ground fall interrupter 81 and a cooling fan 82.

Spargepoint diffusers include several unique configurations as follows:

a. Direct substitute for well screen, 30% porosity 5–50 micron channel size resistance to flow only 1 to 3 PSI, can take high volume flow, needs selective annular pack (sized to formation). High density polyethylene or polypropylene is lightweight, rugged, inexpensive.

b. Diffuser on end of narrow diameter pipe riser KVA 14-291. This reduces the residence time in the riser volume.

c. Shielded microporous diffuser which is injected with a hand-held or hydraulic vibratory hammer. The microporous material is molded around an internal metal (copper) perforated tubing and attached to an anchor which pulls the spargepoint out when the protective insertion shaft is retracted. Unit is connected to surface with 3/16 or 1/4 inch polypropylene tubing with a compression fitting.

d. Thin spargepoint with molded tubing can be inserted down narrow shaft for use with push or vibratory tools with detachable points. The shaft is pushed to the depth desired, then the spargepoint inserted, the shaft is pulled upwards, pulling off the detachable drive point and exposing the spargepoint.

e. Microporous diffuser/pump combination placed within a well screen in such a manner that bubble production and pumping is sequenced with a delay to allow separation of large bubbles from the desired fine "champagne" bubbles. The pressure from the pump is allowed to offset the formation back pressure to allow injection of the remaining fine bubbles into the formation.

Improvements

Figure 7:
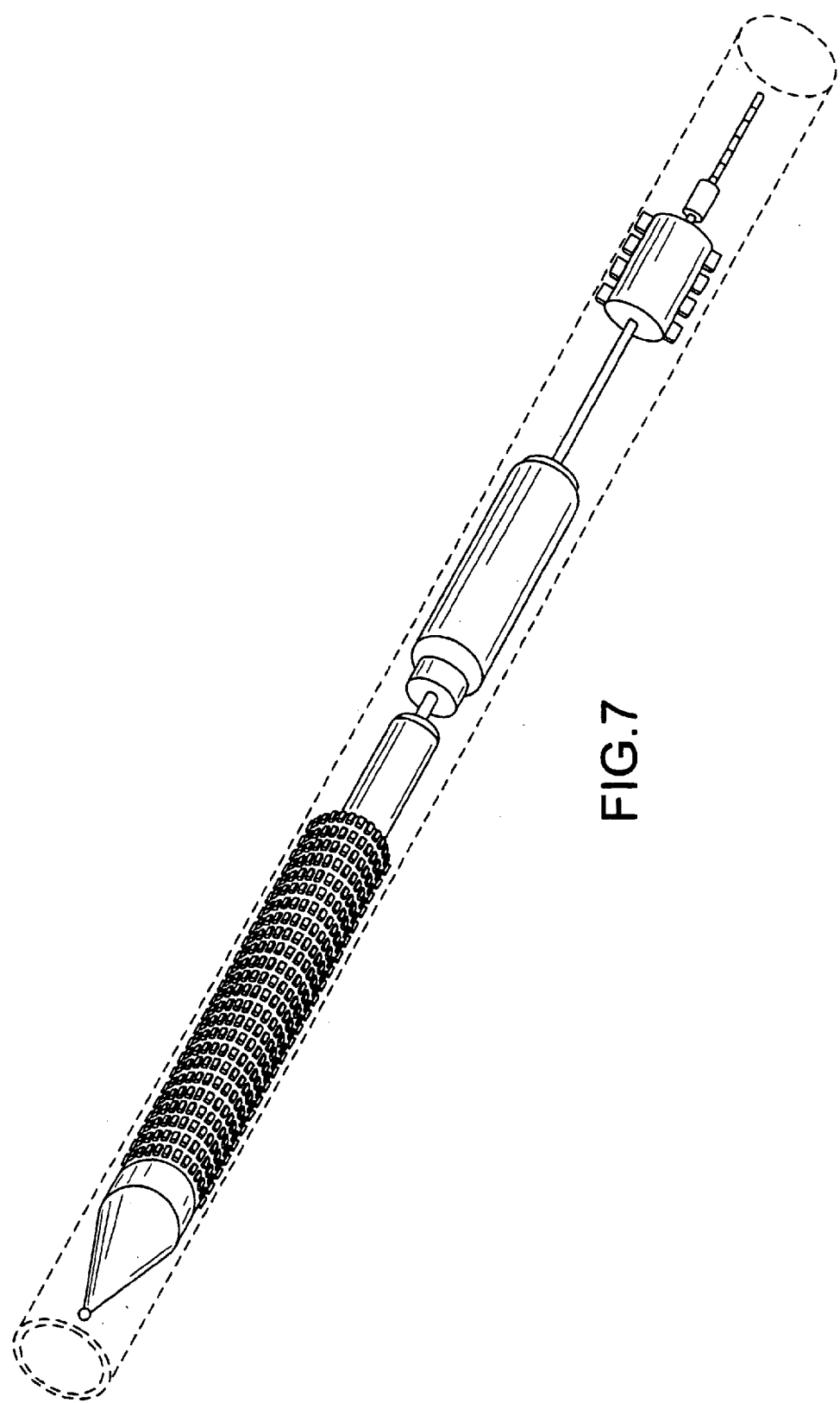
FIG. 7 is a perspective view of a Bubbler Sparge Unit for Groundwater Treatment shown partly in section of the prior embodiment.
Figure 8:
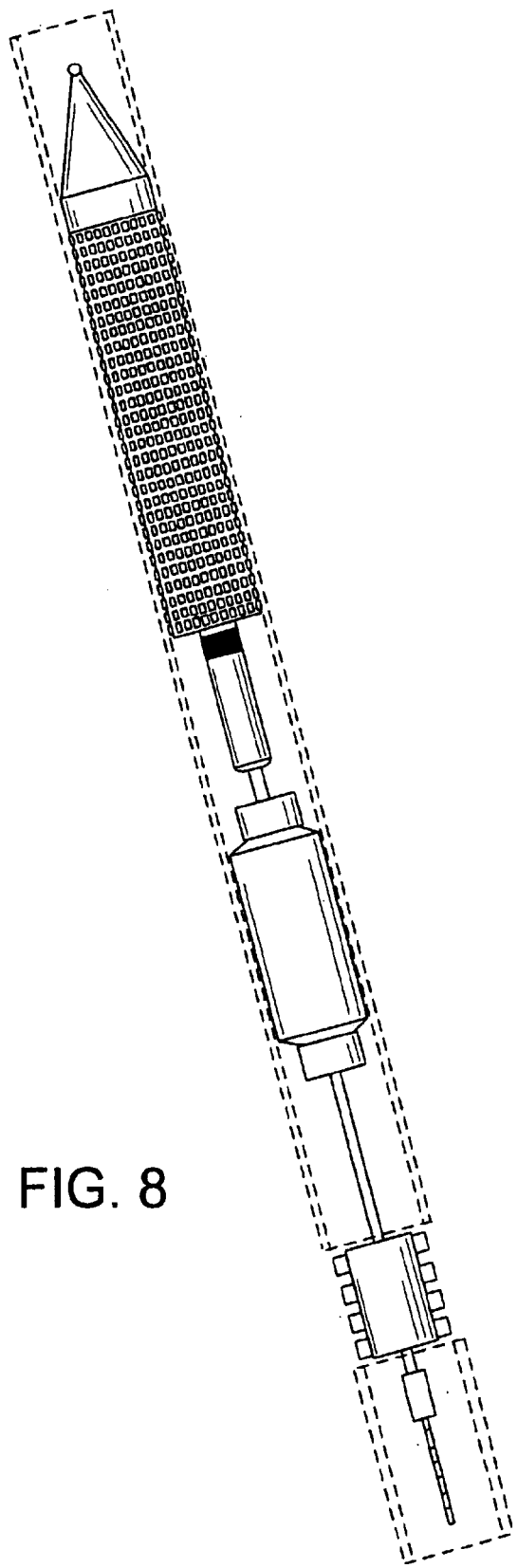
FIG. 8 is a front view of FIG. 7; the rear being a mirror image thereof; is the left side; and the right side.
Figure 9:
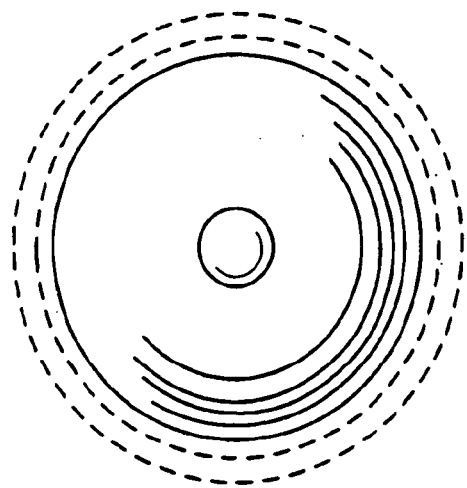
FIG. 9 is a top elevational view of FIG. 7.
Figure 10:
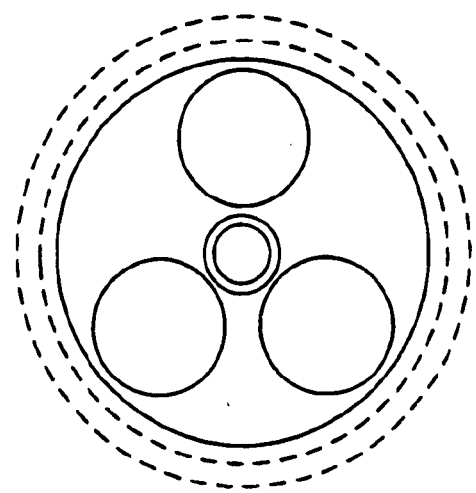
FIG. 10 is a bottom elevational view of FIG. 7.
Figure 11:
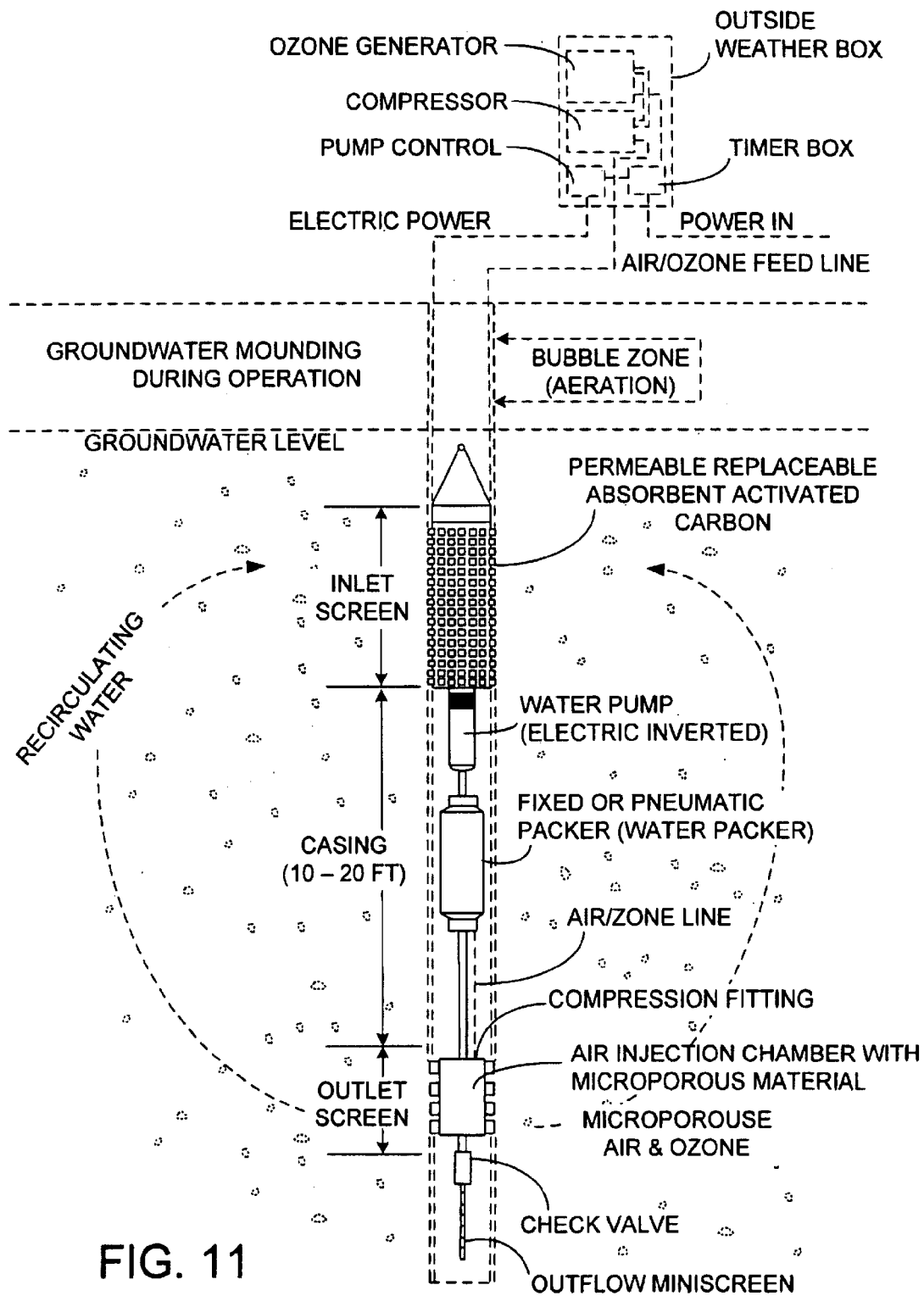
FIG. 11 is a front elevational view of FIG. 7; the broken line showing the sparge bubbler unit in-situ for groundwater treatment.
Figure 12:
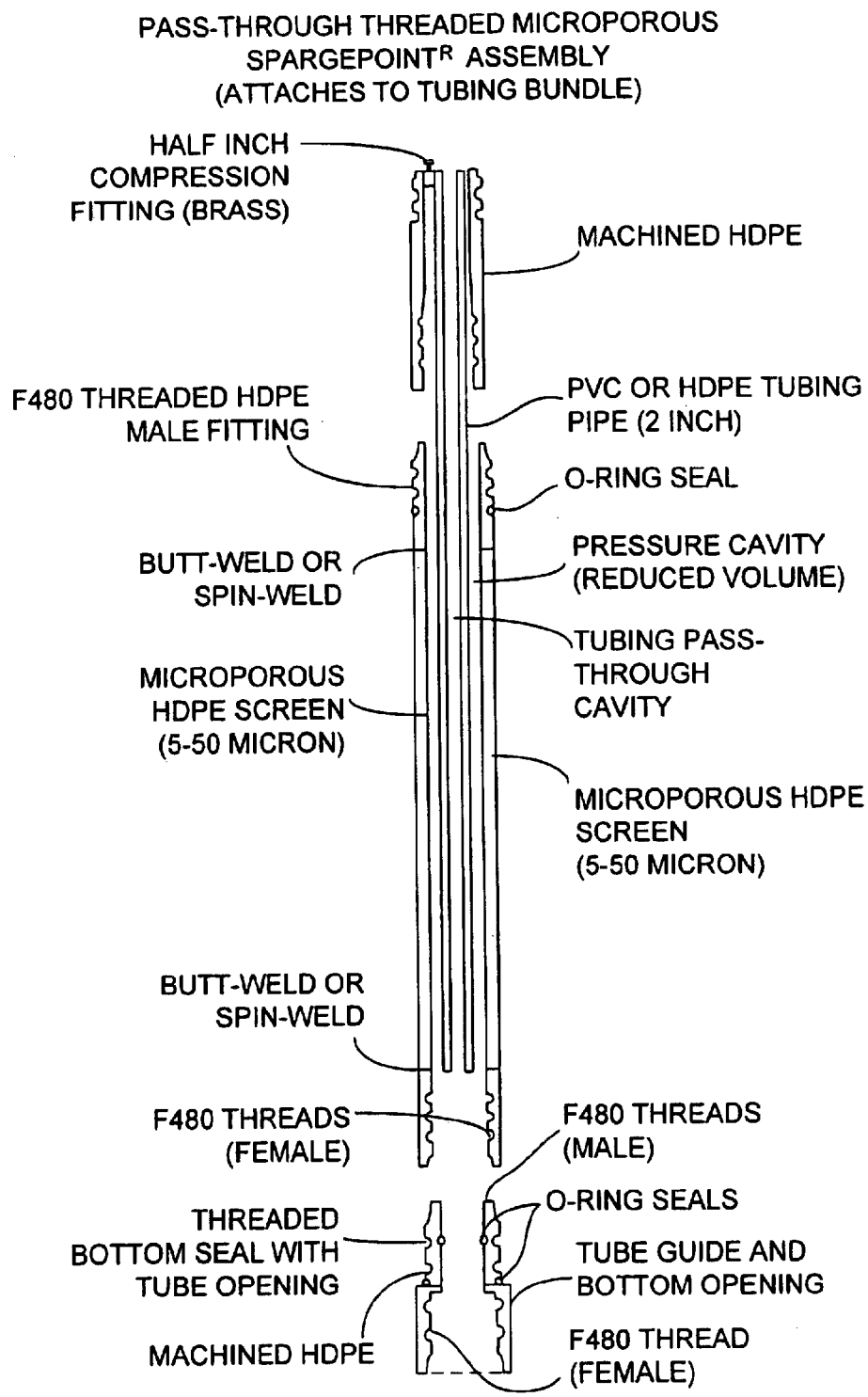
FIG. 12 is an alternate embodiment of a microporous spargepoint assembly of the invention of FIG. 1.
Figure 13:
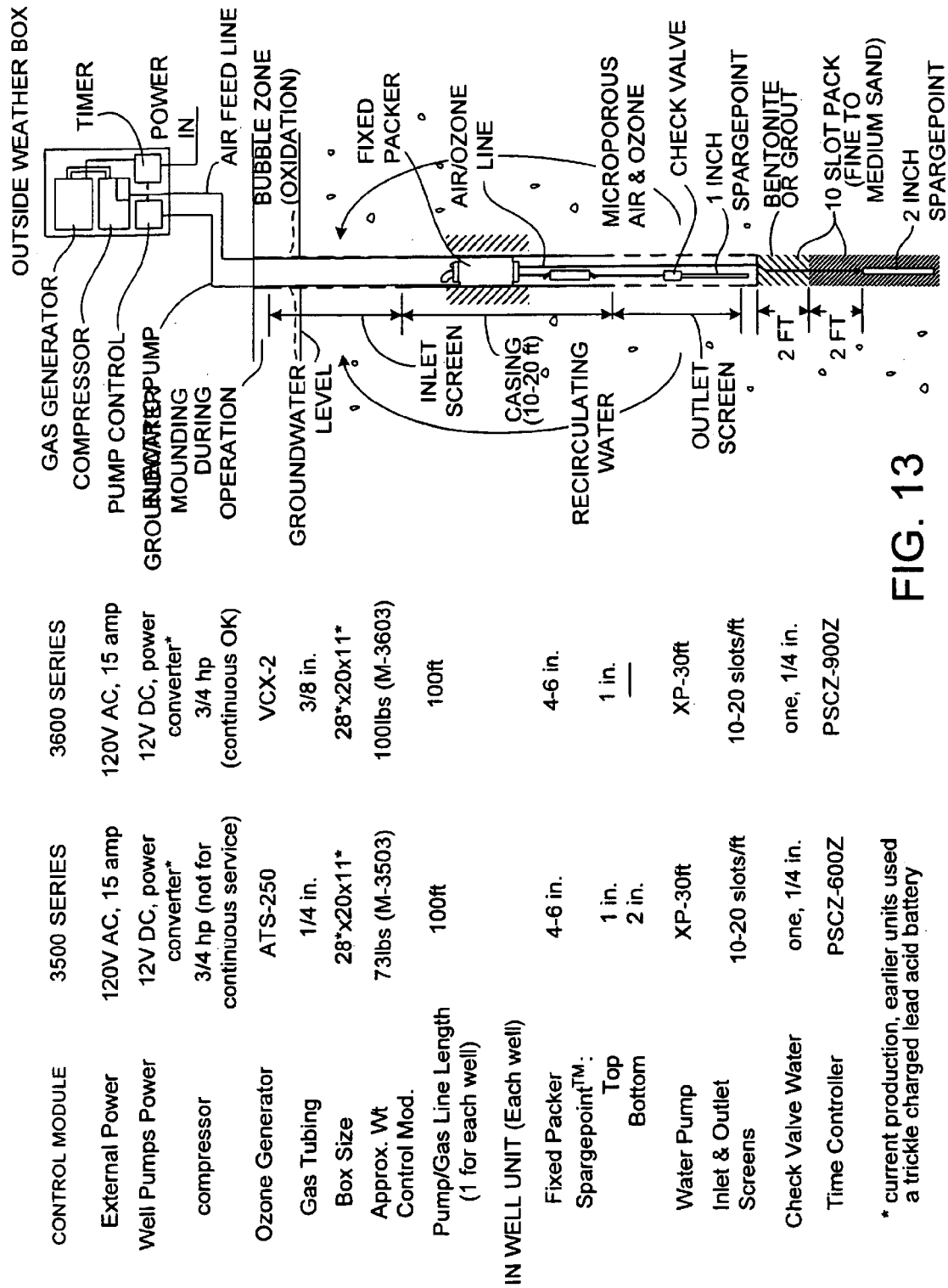
FIG. 13 is an outline of Table 1.

In the present invention the improvement comprises several new equipment designs associated with the spargepoint diffusers. Most important is the submittal for HDPE porous material with well fittings and pass-through design which allows individual pressure and flow control as is shown in FIG. 7.

Secondarily, the push-probe points have been developed for use with pneumatic tools, instead of drilling auger insertion on controls, the right-angle mirror wellhead assembly needs better protection.

Improvements on C-sparger/microporous spargepoint diffuser. One of the major pass-through spargepoints problems in horizontal sparging is even distribution of air bubbles. If inflow is attached to the end of a screen, the pressure drops continuously as air is released from the screen. The resulting distribution of flow causes most bubbles to be produced where the connection occurs with flow alternating outwards. The end of the screen products little or no bubbles.

To allow even distribution of bubbles, either individual spargepoints are bundled (spagetti tube approach) or the spargepoint are constructed in a unique way which allows interval tubing connections with flow and pressure control for each spargepoint region with the proposed arrangement, connecting tubing, to spargepoints passes through the spargepoint internally without interfering with function of producing small bubbles on a smooth external surface (2) the tubing penetration reducing the internal gas volume of the spargepoint, thereby reducing residence time for oxidative gases (important since ozone has only a certain lifetime before decomposition), and allows 3 to 4 spargepoints to be operated simultaneously with equal flow and pressure. Each spargepoint can also be programmed to pulse on a timed sequencer, saving electrical costs and allowing certain unique vertical and horizontal bubble patterns. Spargepoint diffusers can be fitted with F480 Thread with internal bypass and compression fittings:

Advantages (2) fits standars well screen (3) Allows individual flow/pressure control;

(4) Reduces residence time;

(5) Allows casing/sparge instead of continuous bubbler.

Use of Injectable Points configured as Moulded: 18 Inch 0.40 inch HDPE moulded into 1/4 inch pp tubing or HDPE tubing allows smooth tube to be inserted into push probe with detachable point. Use of "Bullet" prepacked Spargepoint diffusers: with KVA "hefty system" prepacked sand cylinder and bentonite cylinder placed over tubing and porous point. Also use of a porous point reinforced with inner metal tube (perforated) to allow strength throughout tubing resists disintegration of plastic during insertion.

Use of Pressure/flow headers: Rodometer/mirror: Mirror assembly for flush-mounted rotometer (flowmeter), allows reading from vertical down and controls flow off lateral lines to adjust to back pressure from varying types of formations (silt, sand, gravel) below.

It is well recognized that the effectiveness of treatment is dependent upon uniformity of dispersions of the gas as it travels through the formation. A porous structure with appropriate packing matches the condition of the pores of the soil with thirty percent (30%) pore distribution. The dispersion of bubbles as a fluid can be checked with Darcy's equation.

The use of microporous materials in the "Spargepoint™" 26 to inject gases into groundwater saturated formations has special advantages for the following reasons:

1. Matching permeability and channel size;
2. Matching porosity;
3. Enhancing fluidity, which can be determined in-situ.

The most effective range of pore space for the diffuser material selected depends upon the nature of the unconsolidated formation to be injected into, but the following serves as a general guide:

1. Porosity of porous material; thirty percent (30%);
2. Pore space: 5–200 microns;
   a. 5–20 very fine silty sand;
   b. 20–50 medium sand;
   c. 50–200 coarse sand and gravel.

The surrounding sand pack placed between the spargepoint 26 and natural material to fill the zone of drilling excavation should also be compatible in channel size to reduce coalescing of the produced bubbles.

The permeability range for fluid injection function without fracturing would follow:

1. $10^{-2}$ to $10^{-6}$ cm/sec, corresponding to 2 to 2000 Darcy's; or
2. $20^{-2}$ to $10^{-6}$ cm/sec; or
3. 100 to 0.01 ft/day hydraulic conductivity.

Permeability is the measure of the ease of movement of a gas through the soil. The ability of a porous soil to pass any fluid, including gas, depends upon its internal resistance to flow, dictated largely by the forces of attraction, adhesion, cohesion, and viscosity. Because the ratio of surface area to porosity increases as particle size decreases, permeability is often related to particle size see Table 2.

What is claimed is:

1. A method for removal of contaminants in a soil formation comprises:
    supplying ambient air and ozone at concentrations to effect removal of the contaminants;
    producing microbubbles containing the ambient air and ozone at concentrations to effect removal of contaminants; and
    introducing the microbubbles containing the ambient air and ozone at concentrations to effect removal of contaminants into the soil formation under conditions that contaminants in a dissolved state in the soil formation are pulled out of the soil formation through the microbubbles and are provided in a vapor state within the microbubbles to react with the ozone contained in the microbubbles in accordance with Henry's law.

2. The method of claim 1 wherein the microbubbles are sized in accordance with a porosity characteristic of the soil formation.

3. The method of claim 1 wherein introducing further comprises:
    providing a plurality of injection wells to introduce the microbubbles containing the ambient air and ozone.

4. The method of claim 3 wherein introducing further comprises:
    using a plurality of microporous diffusers in the plurality of injection wells to introduce the microbubbles containing the ambient air and ozone.

5. The method of claim 1 wherein the soil formation has contaminants, and with the contaminants having a Henry's constant in the order of about $2.59 \times 10^{-2}$ to $4.48 \times 10^{-5}$.

6. The method of claim 1 wherein contaminants in the soil formation are decomposed by ozone interaction in the bubbles with the contaminants.

7. The method of claim 1 wherein the fine bubbles have an initial bubble size at least between about 5 to 200 microns.

8. A method for removal of contaminants in a soil formation comprises:
    providing a plurality of injection wells and introducing ambient air and ozone as microbubbles through the injection wells by using a corresponding micro-porous diffuser for each one of the plurality of injection wells;
    surrounding the micro-porous diffusers with a sand pack disposed between the micro-porous diffusers and the surrounding soil formation; and
    introducing ambient air and ozone as microbubbles by using micro-porous diffusers in the injection wells under conditions that moist soils promote contaminants that exist in a dissolved state in the soil formation to be pulled out of the soil formation through membranes of the microbubbles and react in a vapor state within the microbubbles with the ozone contained in the microbubbles.

9. The method of claim 8 wherein the microbubbles increase the lifetime of ozone in the soil formation.

10. The method of claim 8 wherein removal of contaminants can occur without a vapor extraction.

11. The method of claim 8 further comprising pulsing a water phase to provide steady upward migration of the micro-fine bubbles through the soil formation.

12. The method of claim 8 wherein the soil formation contains chlorinated hydrocarbons.

13. The method of claim 8 wherein the soil formation contains chlorinated ethenes.

14. The method of claim 8 wherein the contaminants include chlorinated ethenes including dichloroethene, trichloroethene, and/or tetrachloroethene.

15. The method of claim 8 wherein the micro-porous diffusers have a pore size between about 5 to 200 microns to provide the fine bubbles.

16. The method of claim 8 wherein the micro-porous diffusers have a pore size selected to match a porosity characteristic of the surrounding soil formation.

17. The method of claim 8 wherein the micro-porous diffusers have a pore size selected to match a porosity characteristic and a permeability characteristic of the surrounding soil formation.

18. A process for removing contaminants, said process comprising:
    injecting gas including an oxidizing gas into a site, the gas injected as bubbles that travel through a soil formation in the site, the bubbles having an initial bubble diameter in a range of about 5 to 200 microns, the bubbles promoting pulling of contaminants into the bubbles and to decompose the contaminants in a reaction with the gas in the bubbles in the presence of water.

19. The process of claim 18 further comprising:
    enhancing decomposition of the contaminants by carrying out the reaction in the presence of a reaction promoter.

20. The process of claim 18 wherein the bubbles of oxidizing gas include oxygen and ozone.

21. The process of claim 18 wherein the bubbles are produced by using a microporous diffuser that has a porosity characteristic matched to soil conditions on the site and fluid acceptance range to avoid fracturing of the substrate structure.

22. The process of claim wherein the bubbles of oxidizing gas include ozone, and the bubbles extract volatile dissolved tetrachloroethene, trichloroethene, and/or dichloroethene while ozone in the bubbles decomposes the tetrachloroethene, trichloroethene, and/or dichloroethene.

23. The process of claim 18 wherein contaminants are dissolved chlorinated hydrocarbons and/or dissolved hydrocarbon products.

24. The process of claim 18 wherein the bubbles contain a mixture of air and ozone to decompose the contaminants; further comprising varying respective concentrations of oxygen and ozone to effect the rate of decomposition.

25. The process of claim 18 wherein injecting occurs by delivering the gas under pressure through a microporous diffuser device that is disposed into the site.

26. The process of claim 18 wherein injecting occurs by delivering the gas under pressure through a microporous diffuser device that is disposed in a well that is provided in the site.

27. The process of claim 18 wherein injecting occurs by delivering the gas under pressure through a microporous diffuser device that is injected into the site.

28. The process of claim 18 wherein injecting occurs by delivering the gas under pressure through a microporous diffuser device that is disposed into an underground aquifer that is under the site.

29. A method of removal of volatile organic compounds in a soil formation comprises:
    injecting air including ozone into the soil formation, the ozone being at concentrations to effect removal of volatile organic compounds, the air including ozone is injected into a sub surface ground water aquifer as fine bubbles with an initial bubble size in a range of about 5 to 200 microns, said fine bubbles traveling through the sub surface ground water aquifer and with the ozone reacting with said volatile organic compounds inside the bubbles.

30. The method of claim 29 wherein the fine bubbles are sized in accordance with a porosity characteristic of the soil formation.

31. The method of claim 29 wherein injecting further comprises:
providing a plurality of injection wells and introducing the ambient air and ozone as fine bubbles between about 5 to 200 microns through the injection wells.

32. The method of claim 31 further comprising introducing the ambient air and ozone through a second plurality of microporous diffusers disposed in the plurality of injection wells.

33. The method of claim 29 further comprising periodically pulsing the air including ozone.

34. The method of claim 29 wherein injecting further comprises:
mixing the ambient air with the ozone.

35. The method of claim 29 wherein injecting further comprises:
mixing the ambient air with the ozone; and
delivering the ambient air and ozone through a plurality of microporous diffusers to produce the fine bubbles of ambient air and ozone.

36. The method of claim 29 wherein volatile organic compounds in the soil formation are decomposed by ozone interaction with double bonded carbon atoms of the volatile organic compounds.

37. The method of claim 29 wherein the fine bubbles have an initial bubble size at least between 50 to 200 microns.

38. The method of claim 29 wherein the fine bubbles have an initial bubble size at least between 20 to 50 microns.

39. The method of claim 29 wherein the fine bubbles have an initial bubble size at least between 5 to 20 microns.

40. The method of claim 29 further comprising:
providing a plurality of injection wells and injecting the ambient air and ozone as fine bubbles through the injection wells by using a corresponding microporous diffuser for each one of the plurality of injection wells; surrounding the microporous diffusers with a sand pack disposed between the microporous diffusers and the surrounding soil formation.

41. The method of claim 29 wherein removal of volatile organic compounds can occur without a vapor extraction.

42. The method of claim 29 further comprising agitating with pumped water to disperse said bubbles through the soil formation.

43. The method of claim 29 wherein the soil formation contains chlorinated hydrocarbons.

44. The method of claim 29 wherein the soil formation contains organic and hydrocarbon material.

45. The method of claim 29 wherein the volatile organic compounds include chlorinated solvents including dichloroethene, trichloroethene, and/or tetrachloroethene.

46. The method of claim 29 wherein microporous diffusers are used to generate said fine bubbles and the microporous materials of the microporous diffusers have a pore size selected to match a porosity characteristic of the surrounding soil formation.

47. The method of claim 46 wherein the microporous materials of the microporous diffusers have a pore size selected to match a porosity characteristic and a permeability characteristic of the surrounding soil formation.

48. The method of claim 29 wherein microporous diffusers are used to generate said fine bubbles and the microporous materials of the microporous diffusers have a pore size selected to match a permeability characteristic of the surrounding soil formation.

49. The method of claim 29 further comprises:
generating an oxidizing agent comprising the ozone at the concentrations to effect removal of contaminants;
mixing ambient air with ozone to produce the air including the ozone.

* * * * *